United States Patent [19]

Smith

[11] 4,203,406
[45] May 20, 1980

[54] EXPANDING PISTON

[76] Inventor: William T. Smith, P.O. Box 23, Pratt Station, Brooklyn, N.Y. 11205

[21] Appl. No.: 866,046

[22] Filed: Dec. 30, 1977

[51] Int. Cl.² .............................................. F02B 75/30
[52] U.S. Cl. ......................... 123/197 A; 123/197 AB; 123/193 P; 123/48 B; 123/78 B
[58] Field of Search ................. 123/78 C, 78 R, 78 B, 123/48 R, 48 B, 193 P, 197 A, 197 AB, 197 R, 78 BA, 78 E; 92/187

[56] References Cited

U.S. PATENT DOCUMENTS

| | | | |
|---|---|---|---|
| 1,379,115 | 5/1921 | Mallory | 123/197 A |
| 1,420,236 | 6/1922 | Bohman | 123/197 A |
| 1,430,491 | 9/1922 | Calcaterra | 123/197 A |
| 1,671,708 | 5/1928 | Frederickson | 123/78 B |
| 2,043,518 | 6/1938 | Rice | 123/78 B |
| 2,369,792 | 2/1945 | Notturno | 123/78 B |
| 2,458,111 | 1/1949 | Soltesz | 123/78 B |
| 2,853,989 | 9/1958 | Teegen | 123/197 A |

FOREIGN PATENT DOCUMENTS 659213 4/1938 Fed. Rep. of Germany ...... 123/197 R

Primary Examiner—Charles J. Myhre
Assistant Examiner—Carl Stuart Miller

[57] ABSTRACT

A compound expanding piston for an internal combustion engine. The piston includes a crown or head and a skirt, with the skirt depending from the crown. A sleeve is provided in telescoping arrangement with the skirt, the sleeve in one embodiment including vertical tabs which extend into corresponding vertical slots formed within the walls of the piston skirt. The telescoping concentric relationship of the sleeve and the skirt may be either with the skirt external to the sleeve or vice versa, in alternative embodiments. The skirt and the sleeve are kinematically linked to each other and to the crankshaft of the engine, so that the piston crown or head is raised to a maximum elevation at both the end of the compression stroke and the end of the expansion stroke of the piston. The piston crown and skirt are lowered to a lower elevation relative to the sleeve during the balance of the work stroke, the sleeve being directly connected to the crankshaft of the engine by a connecting rod.

6 Claims, 9 Drawing Figures

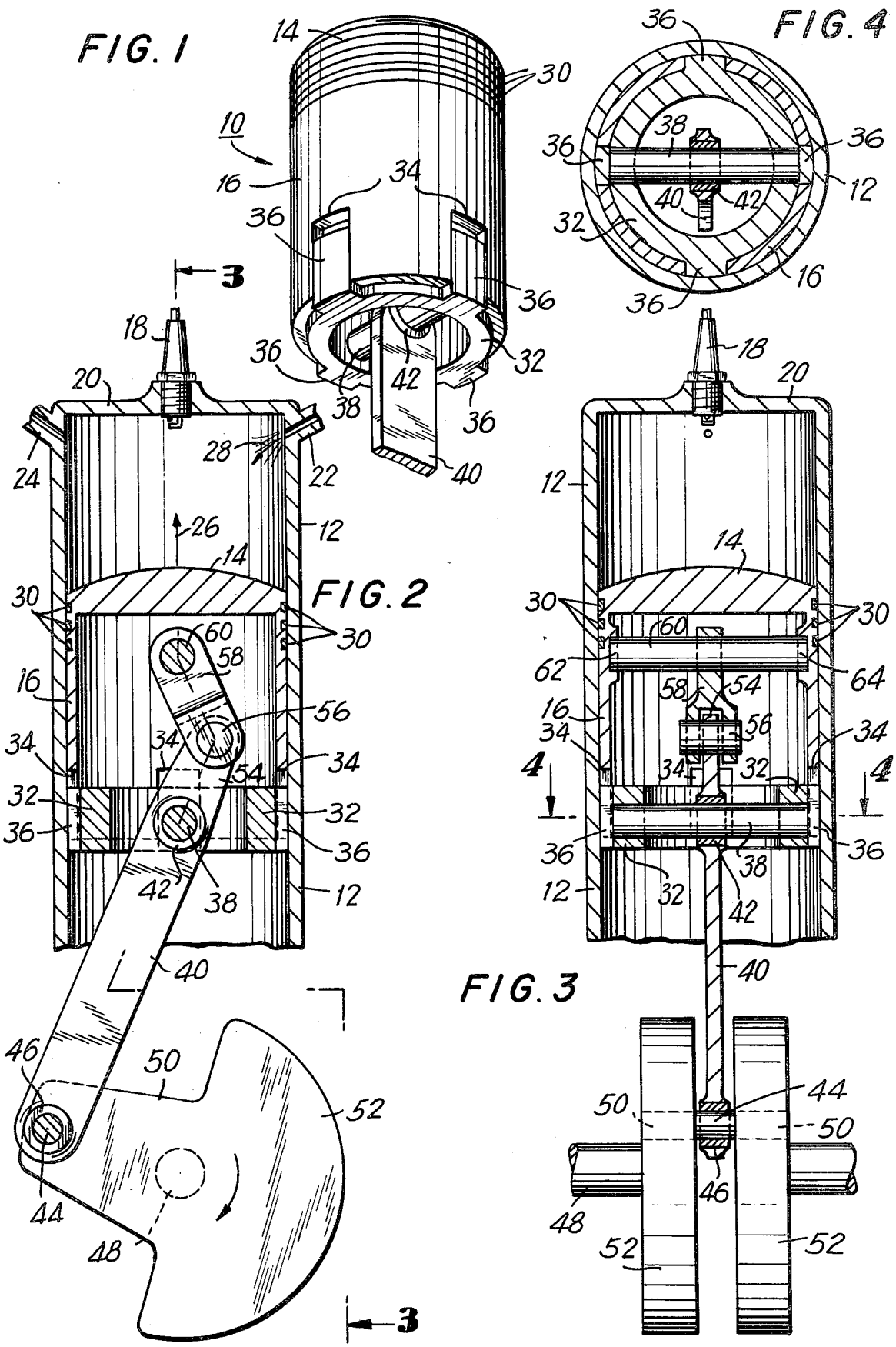

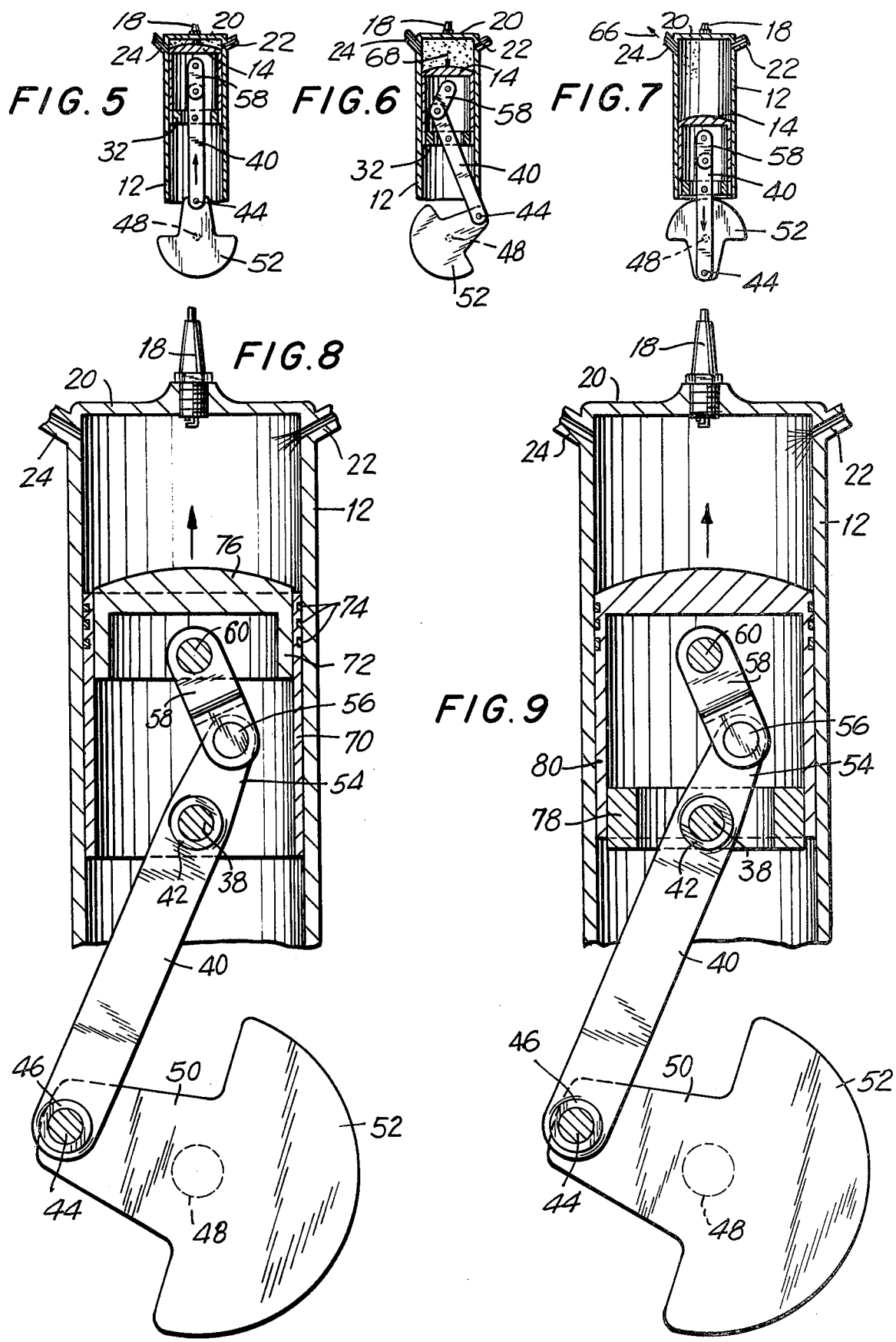

EXPANDING PISTON

BACKGROUND OF THE INVENTION

1. Field of the Invention

The invention relates to compound pistons for internal combustion engines.

2. Description of the Prior Art

Numerous types of compound pistons, i.e. pistons having a plurality of linked movable elements within each cylinder of the engine block, have been developed for internal combustion engines. In these prior art configurations, the top of the piston, i.e. the crown or head of the piston, is only partially extended at the upper end of the stroke. The maximum amount of compression, i.e. the maximum extension of the telescoping members, occurs when the crank is past dead center. The offset of some of these bell cranks, albeit slight, is enough to render the engine less efficient. Generally in the prior art, the two halves of the piston telescope as the piston moves up and then again as the piston reaches the bottom of the stroke. Among the prior art relative to expanding pistons having linkage systems which relatively move the pistons, as the connecting rod moves up and down, may be mentioned U.S. Pat. Nos. 1,379,115; 1,420,236; 1,430,491; 1,671,708; 2,368,412; 2,458,111; 3,034,362; 3,859,976 and 3,908,623.

SUMMARY OF THE INVENTION

1. Purposes of the Invention

It is an object of the present invention to provide an improved compound expanding piston for an internal combustion engine.

Another object is to provide a compound expanding piston in which the crown or head of the piston is raised to a maximum elevation at both the end of the compression stroke and the end of the expansion stroke of the piston.

A further object is to provide a compound expanding piston which results in greater thermodynamic efficiency of an internal combustion engine.

An additional object is to provide a compound expanding piston which achieves greater compression at the upper end of the stroke of the piston.

Still another object is to provide a compound expanding piston which achieves greater compression at the lower end of the stroke of the piston.

Still a further object is to provide a compound expanding piston which achieves greater compression at both the top and bottom (or upper and lower) ends of the stroke of the piston.

Still another object is to provide a compound expanding piston which, when installed in a cylinder of an engine block of an internal combustion engine, results in the generation of a greater amount of power per unit amount of fuel consumed.

These and other objects and advantages of the present invention will become evident from the description which follows.

2. Brief Description of the Invention

In the present invention, the device constitutes an arrangement for reducing cylinder head space at the moment of combustion thereby raising the compression ratio. This is done by providing a piston which is in two telescoping pieces associated with a linkage system which raises the piston head to a maximum elevation at the end of the compression stroke and to a maximum elevation at the end of an expansion stroke, but lowers the piston crown or head relative to an internal sleeve during the first half of the work stroke, and raises it again during the second half of the work stroke. Several embodiments of linkage system and piston are provided to accomplish this result.

In general, the present invention entails a compound expanding piston for an internal combustion engine having an engine block with at least one cylinder in the block, and a crankshaft. The piston is disposed in the cylinder and has a crown or head and a skirt. The skirt is integral with and depends from the crown. A sleeve is provided within the cylinder, with the sleeve cooperating with the piston skirt, i.e. the skirt and the sleeve are in a telescoping relationship and are kinematically linked to each other and to the crankshaft of the engine. In this manner, the piston crown is raised to a maximum elevation at both the end of the compression stroke of the piston and the end of the expansion stroke of the piston. Because of the contemplated kinematic relationship, the piston crown and skirt are lowered to a lower elevation relative to the sleeve during the balance of the work stroke. The sleeve is directly connected to the crankshaft by a connecting rod, with a pivotal wrist pin connection extending between the connecting rod and the sleeve.

In one embodiment of the invention, the skirt is concentrically disposed about the sleeve. In this embodiment, a preferred configuration is one in which the end of the skirt spaced away from the piston crown is provided with a plurality of spaced apart annular vertical slots, and the sleeve is provided with a plurality of spaced apart annular vertical tabs, with each of the tabs extending into one of the slots. The purpose for this modification of having the inner sleeve pass through the outer piston skirt is to transmit the pressure of the inner sleeve to the cylinder wall.

In another embodiment, the sleeve is concentrically disposed about the skirt. In this case, at least one and preferably a plurality of parallel piston rings will be provided about the periphery of the sleeve. The piston ring or rings are typically disposed adjacent the end of the sleeve juxtaposed with the piston crown.

The preferred kinematic linkage between the piston and the sleeve entails the provision of a first connecting rod, i.e. the connecting rod mentioned supra. The first connecting rod extends from the crankshaft and beyond a first wrist pin to a terminus. The first wrist pin pivotally connects the first connecting rod to the sleeve. A second wrist pin pivotally connects the aforementioned terminus of the first connecting rod to one end of a second connecting rod. A third wrist pin pivotally connects the other end of the second connecting rod to the piston; typically the other end of the second connecting rod is pivotally connected to the skirt of the piston.

In most instances and typically when the sleeve is concentrically disposed within the skirt, at least one and preferably a plurality of parallel piston rings will be provided about the periphery of the skirt of the piston. The piston ring or rings are typically disposed adjacent the end of the skirt juxtaposed with the piston crown.

The present invention provides several salient advantages. Cylinder head space is reduced at the moment of compression, thereby raising the compression ratio, since the crown or head of the piston is raised to a maximum elevation at both the end of the compression stroke and the end of the expansion stroke of the piston. The present compound expanding piston results in greater thermodynamic efficiency of an internal combustion engine, since greater compression at the upper end of the stroke of the piston is achieved. Finally, the present compound expanding piston, when installed in a cylinder of an engine block of an internal combustion engine, results in the generation of a greater amount of power per unit amount of fuel consumed.

The invention accordingly consists in the features of construction, combination of elements and arrangement of parts which will be exemplified in the compound expanding piston hereinafter described and of which the scope of application will be indicated in the appended claims.

BRIEF DESCRIPTION OF THE DRAWINGS

In the accompanying drawings in which are shown several of the various possible embodiments of the invention;

FIG. 1 is a perspective view of one embodiment of the invention, in which the sleeve is concentrically disposed within the skirt of the piston;

FIG. 2 is a sectional elevation view of the embodiment of FIG. 1;

FIG. 3 is a sectional elevation view taken substantially along the lines 3—3 of FIG. 2;

FIG 4 is a sectional plan view taken substantially along the lines 4—4 of FIG. 3;

FIGS. 5, 6 and 7 show the compound expanding piston of FIGS. 1, 2, 3 and 4 at various times during the stroke of the piston;

FIG. 8 is a sectional elevation view showing an alternative embodiment of the compound expanding piston; and FIG. 9 is a sectional elevation view showing still another alternative embodiment of the present invention.

DETAILED DESCRIPTION OF THE PREFERRED EMBODIMENTS

Referring now to FIGS. 1, 2, 3 and 4, a piston 10 is coaxially disposed within a cylindrical cylinder 12 of the engine block of an internal combustion engine, with the wall of cylinder 12 concentrically surrounding the piston 10. The piston 10 is provided with a crown or head 14 and a skirt 16, with the skirt 16 being integral with and dependent from the crown 14. A spark plug 18 is mounted in the head or top 20 of the cylinder 12, and an intake port 22 and an exhaust port 24 are provided in the cylinder wall 12 adjacent the top 20 of the cylinder 12. As shown, the piston 10 is at an intermediate position in the compression stroke, and is moving upwards as indicated by arrow 26 (FIG. 2). An intake valve, not shown, is open and is in fluid-transmissive connection with intake port 22, so that a charge of fuel, e.g. vaporized gasoline, and air, is being admitted into the cylinder as indicated by arrow 28. An exhaust valve, not shown, is closed. This exhaust valve is in fluid-transmissive connection with exhaust port 24. A plurality of parallel piston rings 30 are disposed about the periphery, in this case the perimeter, of the skirt 16 adjacent the crown or head 14 of the piston 10.

In accordance with the present invention, a sleeve 32 is concentrically disposed within the lower end of the skirt 16. The skirt 16 is provided with an annular plurality of lower slots 34, which cooperate with an annular plurality of tabs 36 disposed about the perimeter of sleeve 32, so that the respective elements 16 and 32 are guided in conjunction.

The kinematic linkage contemplated in the present invention will now be described. A first wrist pin 38 pivotally connects a first connecting rod 40 to the sleeve 32. A bushing 42 is provided between the wrist pin 38 and the connecting rod 40. The connecting rod 40 extends from a pivotal connection pin 44, which connects the rod 40 via a bushing 46 to a crankshaft 48 via a shoulder 50. A counterweight 52, or in this case a pair of counterweights 52 (FIG. 3) and associated shoulders 50, are mounted to the crankshaft 48 opposite to the shoulders 50, to provide balanced rotation of the assemblage and thus to prevent eccentric stress on the bushing 46. The connecting rod 40 extends to a terminus 54 having a terminal connection about a second wrist pin 56. The wrist pin 56 pivotally connects the terminus 54 of the connecting rod 40 to one end of a second connecting rod 58. The other end of the connecting rod 58 is pivotally connected via a third wrist pin 60 to the piston 10, typically to the skirt 16 as best shown in FIG. 3, in which the ends 62 and 64 of the wrist pin 60 fit into recesses or sockets in the inner surface of the skirt 16. Similar mounting of the wrist pin 38 to the sleeve 32 is provided, as best shown in FIGS. 3 and 4.

The present kinematic linkage, as is evident from the foregoing, moves the elements 52, 48, 50, 44, 40, 38, 32, 54, 56, 58, 60, 16 and 14 in conjunction, so that as is evident from FIGS. 5, 6 and 7, as the crankshaft 48 is rotated by the piston 10 in a manner commonly understood by those skilled in the art of internal combustion engines, the piston crown 14 is raised to a maximum elevation both at the end of the compression stroke of the piston 10 (FIG. 5), at which time the fuel and air charge 28 is ignited by the firing of the spark plug 18, and also at the end of the expansion stroke of the piston 10 (FIG. 7), at which time exhaust gases stream 66 are beginning to be discharged via exhaust port 24. Thus FIGS. 5 and 7 show elements 58 and 40 in a rectilinear orientation, and it is apparent that both the FIGS. 5 and 7 dispositions of the respective elements, the crown 14 is raised to a maximum elevation relative to the sleeve 32. FIG. 6 shows the elements in an intermediate position during the power stroke, with force being exerted as indicated by arrow 68 against the crown 14 by the combustion of the fuel with air within the chamber defined by cylinder 12, cylinder head 20, and piston crown 14.

FIG. 8 shows an alternative embodiment of the invention, in which a sleeve 70 is disposed external to a skirt 72. In this case, a plurality of parallel piston rings 74 are disposed on the outer peripheral surface of the sleeve 70 adjacent to crown or head 76 of the piston. In other aspects, the FIG. 8 embodiment is comparable to the prior configuration discussed supra. FIG. 9 shows a sleeve concentrically disposed within a skirt 80, similarly to the FIGS. 1-4 embodiment, however in this case, the slots and tabs structures are omitted.

The use of the invention reduces head space at the end of the compression stroke whereby to increase compression ratio. It further results in a more efficient scavenging so that the charge is less polluted with products of combustion left from the previous working stroke.

The invention is useful with reciprocating internal combustion engines of all types, e.g., spark ignition and compression ignition engines, 2-cycle and 4-cycle engines, engines which use a combustible charge of air admixed with fuel and engines which use solid injected fuel, and engines using various thermodynamic cycles, such for instance as Otto and Diesel.

It thus will be seen that there is provided a compound expanding piston which achieves the various objects of the invention and which is well adapted to meet the conditions of practical use.

As various possible embodiments might be made of the above invention, and as various changes might be made in the embodiments above set forth, it is to be understood that all matter herein described or shown in the accompanying drawings is to be interpreted as illustrative and not in a limiting sense. Thus, it will be understood by those skilled in the art that although preferred and alternative embodiments have been shown and described in accordance with the Patent Statutes, the invention is not limited thereto or thereby.

Having thus described the invention, there is claimed as new and desired to be secured by Letters Patent:

1. In combination, an internal combustion engine having a block with at least one cylinder in said block, a crankshaft, a piston with a crown and a skirt, and a connecting rod connecting the crankshaft to the piston, that improvement comprising:

a sleeve forming part of the piston, said skirt and said sleeve being in a telescoping relationship, the end of said skirt spaced away from said piston crown being provided with a plurality of spaced apart annular vertical slots, said sleeve being provided with a plurality of spaced apart annular vertical tabs, each of said tabs extending into one of said slots, and means kinematically linking the piston and sleeve to each other and to said crankshaft so that said crown is raised to a maximum elevation relative to said sleeve both at the end of the compression stroke of said piston and the end of the expansion stroke of said piston, said crown and skirt being lowered to a lower elevation relative to said sleeve as it approaches the center of the stroke and being raised as it leaves the center of the stroke.

2. The expanding piston of claim 1 in which the skirt is concentrically disposed about the sleeve.

3. The expanding piston of claim 1 in which the kinematic linkage between the piston and the sleeve comprises a first connecting rod, said first connecting rod extending from the crankshaft and beyond a first wrist pin to a terminus, said first wrist pin pivotally connecting said first connecting rod to the sleeve, a second wrist pin, said second wrist pin pivotally connecting said terminus of the first connecting rod to one end of a second connecting rod, and a third wrist pin, said third wrist pin pivotally connecting the other end of said second connecting rod to the piston.

4. The expanding piston of claim 3 in which the other end of the second connecting rod is pivotally connected to the skirt of the piston.

5. The expanding piston of claim 1 in which at least one piston ring is provided about the periphery of the skirt of the piston.

6. The expanding piston of claim 5 in which a plurality of parallel piston rings are provided about the periphery of the skirt of the piston, said parallel piston rings being disposed adjacent the end of the skirt juxtaposed with the piston crown.

* * * * *